(12) United States Patent
Yoakum et al.

(10) Patent No.: US 10,645,218 B2
(45) Date of Patent: May 5, 2020

(54) CONTACT CENTER INTERACTIVE TEXT STREAM WAIT TREATMENTS

(71) Applicant: Avaya Inc., Basking Ridge, NJ (US)

(72) Inventors: John H. Yoakum, Cary, NC (US); Tony McCormack, Galway (IE)

(73) Assignee: Avaya Inc., Santa Clara, CA (US)

( * ) Notice: Subject to any disclaimer, the term of this patent is extended or adjusted under 35 U.S.C. 154(b) by 521 days.

(21) Appl. No.: 14/529,567

(22) Filed: Oct. 31, 2014

(65) Prior Publication Data

US 2016/0127544 A1    May 5, 2016

(51) Int. Cl.
| | | |
|---|---|---|
| G06F 17/00 | (2019.01) | |
| H04M 3/428 | (2006.01) | |
| G06F 3/01 | (2006.01) | |
| H04M 1/725 | (2006.01) | |
| H04M 3/523 | (2006.01) | |
| H04M 3/51 | (2006.01) | |

(52) U.S. Cl.
CPC .......... H04M 3/4285 (2013.01); G06F 3/013 (2013.01); H04M 1/72552 (2013.01); H04M 3/5166 (2013.01); H04M 3/5232 (2013.01)

(58) Field of Classification Search
CPC .................................................. H04M 3/4285
See application file for complete search history.

(56) References Cited

U.S. PATENT DOCUMENTS

| | | | | |
|---|---|---|---|---|
| 8,301,474 B2* | 10/2012 | Hartman | ................ | G06N 3/006 705/7.11 |
| 2003/0038754 A1* | 2/2003 | Goldstein | ............... | G06F 3/013 345/7 |
| 2006/0066567 A1* | 3/2006 | Scharenbroch | ........ | G02B 27/01 345/156 |
| 2009/0006549 A1* | 1/2009 | Singh | ..................... | G06Q 10/10 709/204 |
| 2009/0006550 A1* | 1/2009 | Singh | ..................... | G06Q 30/02 709/204 |
| 2011/0066938 A1* | 3/2011 | Nageswaram | ....... | G06Q 10/107 715/706 |
| 2012/0190333 A1* | 7/2012 | Portman | ............. | H04L 65/4007 455/411 |
| 2012/0256967 A1* | 10/2012 | Baldwin | ................. | G06F 3/013 345/684 |
| 2012/0266258 A1* | 10/2012 | Tuchman | .............. | H04L 63/104 726/28 |
| 2013/0223613 A1* | 8/2013 | Birk | .................... | H04M 3/5237 379/265.06 |
| 2013/0251136 A1* | 9/2013 | Simoes | ............... | H04M 3/5191 379/265.09 |

(Continued)

OTHER PUBLICATIONS

Johnston, Alan B. et al., "WebRTC: APIs and RTCWEB Protocols of the HTML5 Real-Time Web," 2nd Edition (2013 Digital Codex LLC), Jun. 2013, 254 pages.

*Primary Examiner* — Mustafa A Amin
(74) *Attorney, Agent, or Firm* — Sheridan Ross P.C.

(57) ABSTRACT

Contact center interactive text stream wait treatments are disclosed. A user device initiates a communication interaction with an automated contact center device (ACCD). A text stream comprising a plurality of text components is from the ACCD during an agent wait period. The text components of the text stream are provided for presentation in a display area of a display during the agent wait period.

15 Claims, 14 Drawing Sheets

(56) References Cited

U.S. PATENT DOCUMENTS

| | | | |
|---|---|---|---|
| 2014/0195675 A1* | 7/2014 | Silver | H04L 65/1083 |
| | | | 709/224 |
| 2014/0204029 A1* | 7/2014 | Lopez | G06F 3/013 |
| | | | 345/163 |
| 2014/0247232 A1* | 9/2014 | George-Svahn | G06F 3/02 |
| | | | 345/173 |
| 2014/0365334 A1* | 12/2014 | Hurewitz | G06Q 30/0613 |
| | | | 705/26.41 |
| 2015/0091793 A1* | 4/2015 | Lee | G06F 3/013 |
| | | | 345/156 |
| 2015/0117631 A1* | 4/2015 | Tuchman | H04M 3/5233 |
| | | | 379/265.09 |
| 2015/0363787 A1* | 12/2015 | Vasquez | G06Q 30/016 |
| | | | 705/304 |
| 2016/0127544 A1* | 5/2016 | Yoakum | H04M 3/4285 |
| | | | 379/265.09 |

* cited by examiner

CONTACT CENTER INTERACTIVE TEXT STREAM WAIT TREATMENTS

TECHNICAL FIELD

The embodiments relate to wait treatments during a wait period for a contact center agent, and in particular to facilitating customizable interactive text stream wait treatments during a wait period.

BACKGROUND

Contact centers are widely used to route callers, or users, who seek help to an appropriate operator, or agent. It is not uncommon that the number of users at a given point in time exceeds the number of agents available to support such users. Inevitably, a user may be asked to wait until an agent is available. The period of time that the user waits will be referred to herein as a wait period. User satisfaction with a company or other entity that utilizes a contact center may be directly related to the length of such wait periods. If the user can be suitably entertained, or occupied, during such wait periods, the user is less likely to be dissatisfied than if the user is simply waiting, without any form of entertainment to preoccupy the user.

Some contact center operations provide music during a wait period in an attempt to provide a distraction, in the form of entertainment, to the user while the user waits. Unfortunately, many users do not enjoy the selection of music, or are not in a location where it is possible, or practical, to play music.

Increasingly, users make calls to entities that utilize a contact center via a multi-function device that is network-capable, which thereby facilitates voice and data connections over relatively widely available wireless local area network connections, and/or via a multi-function device that is cellular-capable, which facilitates cellular voice and data connections over widely available cellular connections. Such multi-function devices come in an increasing variety of form factors, and include, for example, smartphones, computing tablets, and wearable devices that are coupled to a body part of a user, such as a wrist. Given the increased functional capabilities of such devices compared to conventional telephones, it would be desirable for a contact center to provide a user with wait treatments other than music that may better occupy the user during such wait periods.

SUMMARY

The embodiments relate to systems, methods, apparatuses, and computer-readable media, for facilitating text stream wait treatments during a wait period of a communication interaction with a contact center. In one embodiment, a topic, or category, may be selected by a user during the wait period, and in response, one or more text streams comprising content in such topic or category are streamed to a user device associated with the user.

In one embodiment, a user device initiates a communication interaction with an automated contact center device (ACCD). The user device receives, from the ACCD during an agent wait period, a text stream comprising a plurality of text components during the agent wait period. The user device provides the plurality of text components of the text stream for presentation in a display area of a display during the agent wait period.

In one embodiment, the user device receives from the ACCD, a plurality of text stream categories. At least some of the plurality of text stream categories is presented in the display area of the display. Input from a user is received that selects a particular text stream category of the plurality of text stream categories. Data that identifies the particular text stream category is communicated to the ACCD, and the text stream received from the ACCD comprises textual content that is in the particular text stream category. In one embodiment the user device analyzes an eye system of the user, and determines, based on analyzing the eye system, a text category selection command that identifies the particular text stream category.

In one embodiment, an eye system of a user is analyzed while concurrently providing the plurality of text components for presentation in the display area. It is determined, based on analyzing the eye system, that the user has issued a display text stream categories command. In response, a request for a plurality of text stream categories is sent to the ACCD. The plurality of text stream categories is received from the ACCD, and the plurality of text stream categories is provided for presentation in the display area in lieu of the plurality of text components of the text stream.

In one embodiment, prior to providing the text components of the text stream for presentation in the display area during the agent wait period, textual instructions that identify a plurality of eye movements and a plurality of control commands that correspond to the plurality of eye movements are presented in the display area.

In another embodiment, a method implemented on an ACCD is provided. An ACCD associated with an automated contact center establishes a communication interaction with a user device. It is determined that no agent is available. The ACCD provides, to the user device during an agent wait period, a text stream comprising a plurality of text components for presentation on the user device.

In one embodiment, the ACCD establishes a video channel with the user device. The ACCD receives, from the user device via the video channel, a video stream depicting an eye system of a user associated with the user device. The ACCD determines, based on an analysis of the video stream, that the user has issued a control command that requests a change in a characteristic of the presentation. In response to the control command, the ACCD provides subsequent text components in a manner that implements the change in the characteristic of the presentation in accordance with the control command.

In one embodiment, the ACCD provides, to the user device, a plurality of text stream categories. The ACCD receives, from the user device, a text stream category identifier that identifies a selected text stream category of the plurality of text stream categories. A text source that comprises content in the selected text stream category is accessed, and a text stream is provided for presentation on the user device from the text source.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
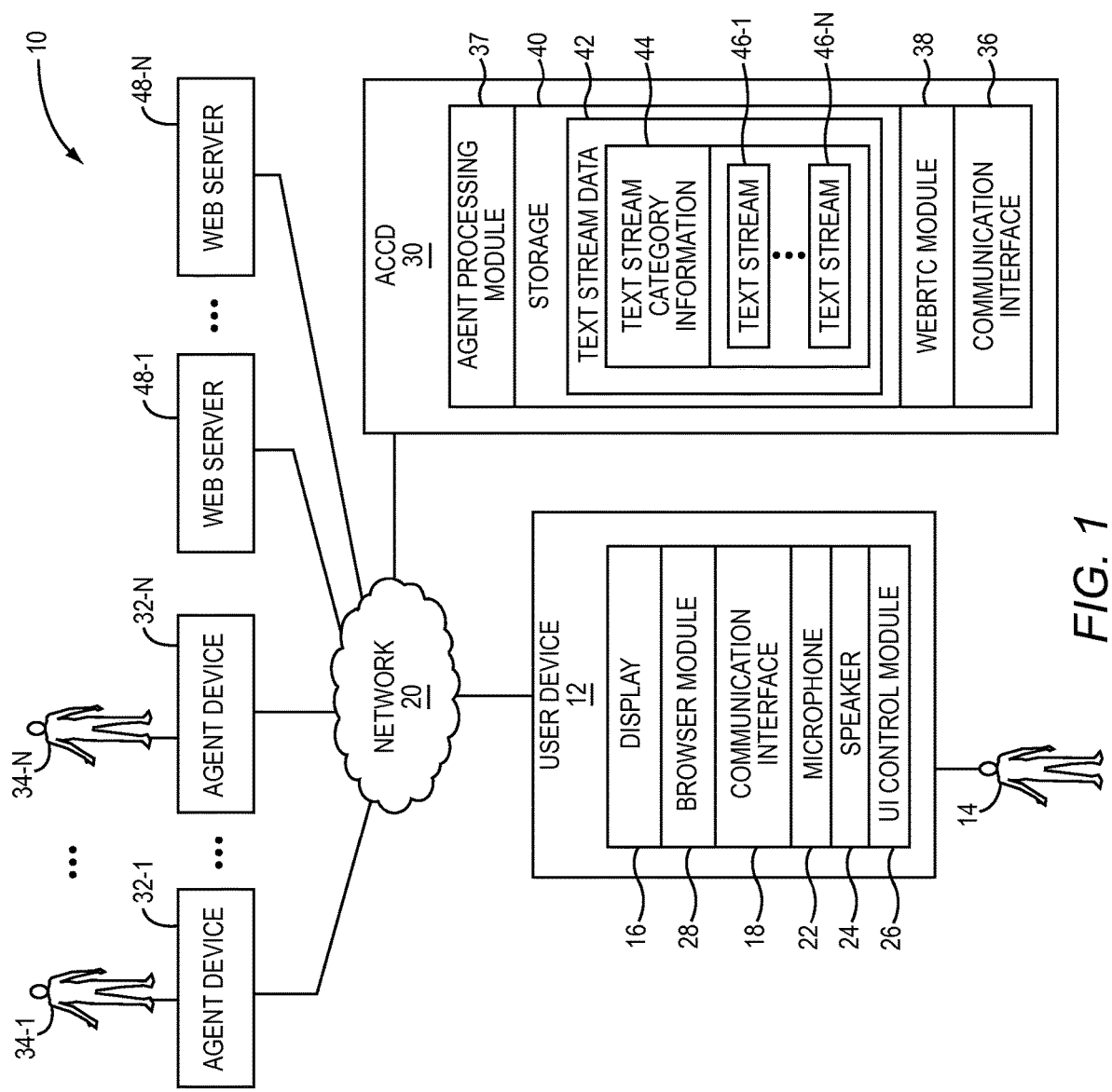
FIG. 1 is a block diagram of a system according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first pace" and "second pace," and does not imply a priority, a type, an importance, or other attribute, unless otherwise stated herein.

The embodiments relate to systems, methods, apparatuses, and computer-readable media, for facilitating text stream wait treatments during a wait period of a communication interaction with a contact center. In one embodiment, a topic, or category, may be selected by a user during the wait period, and in response, one or more text streams comprising content in such topic or category are streamed to a user device associated with the user.

Some embodiments may optionally utilize Web Real-Time Communications (WebRTC) to implement certain functionality disclosed herein. WebRTC is a set of standards for integrating real-time communications functionality into web clients, such as web browsers, to enable direct interaction with other web clients. This real-time communications functionality is accessible by web developers via standard markup tags, such as those provided by version 5 of the Hypertext Markup Language (HTML5), and client-side scripting Application Programming Interfaces (APIs) such as JavaScript APIs. More information regarding WebRTC may be found in "WebRTC: APIs and RTCWEB Protocols of the HTML5 Real-Time Web," by Alan B. Johnston and Daniel C. Burnett, 2nd Edition (2013 Digital Codex LLC), which is incorporated herein by reference in its entirety.

WebRTC provides built-in capabilities for establishing real-time video, audio, and/or data streams in both point-to-point interactive sessions and multi-party interactive sessions. The WebRTC standards are currently under joint development by the World Wide Web Consortium (W3C) and the Internet Engineering Task Force (IETF).

To establish a WebRTC interactive flow (e.g., a real-time video, audio, and/or data exchange), two WebRTC clients may retrieve WebRTC-enabled web applications, such as HTML5/JavaScript web applications, from a web application server. Through the web applications, the two WebRTC clients then engage in a dialogue for initiating a peer connection over which the WebRTC interactive flow will pass. The peer connection initiation dialogue includes any data transmitted between the two WebRTC clients and/or the web application server facilitating the establishment of the WebRTC interactive flow. As non-limiting examples, the peer connection initiation dialogue may include WebRTC session description objects, HTTP header data, certificates, cryptographic keys, and/or network routing data. The peer connection initiation dialogue may include a media negotiation to communicate and reach an agreement on parameters that define characteristics of the WebRTC interactive flow.

In some embodiments, the media negotiation may be implemented via a WebRTC offer/answer exchange. A WebRTC offer/answer exchange typically occurs via a secure network connection such as a Hypertext Transfer Protocol Secure (HTTPS) connection or a Secure WebSockets connection. In a WebRTC offer/answer exchange, a first WebRTC client on a sender computing device sends an "offer" to a second WebRTC client on a recipient computing device. The offer includes a WebRTC session description object that specifies media types and capabilities that the first WebRTC client supports and prefers for use in the WebRTC interactive flow. The second WebRTC client then responds with a WebRTC session description object "answer" that indicates which of the offered media types and capabilities are supported and acceptable by the second WebRTC client for the WebRTC interactive flow. It is to be understood that the peer connection initiation dialogue may employ mechanisms other than a WebRTC offer/answer exchange to establish a WebRTC interactive flow between WebRTC clients.

Once the peer connection initiation dialogue is complete, the WebRTC clients may then establish a direct peer connection with one another, and may begin an exchange of media or data packets transporting real-time communications. The peer connection between the WebRTC clients typically employs the Secure Real-time Transport Protocol (SRTP) to transport real-time media flows, and may utilize various other protocols for real-time data interchange.

FIG. 1 is a block diagram of a system 10 according to one embodiment. The system 10 includes a user device 12. The user device 12 may offer a user 14 any desired functionality, or functionalities, and may comprise, by way of non-limiting example, a smartphone, a computing tablet, a fitness device, a timekeeping device, a news or information device, or the like. In some embodiments, the user device 12 may be a wearable device, such as may be worn on a body part, such as a wrist, or on the face in the form of wearable headgear, such as Google Glass. In some embodiments, the user device 12 may have a very small form factor that is dictated primarily by the size of a display 16, on which textual information, in the form of a text stream, may be presented to the user 14. In some embodiments, the display 16 may have input controls, such as touch screen capabilities, one or more buttons, dials, or the like, to facilitate the receipt of inputs from the user 14.

The user device 12 includes one or more communication interfaces 18, that facilitate communications with a network 20 using any desired communication technology, such as, by way of non-limiting example, cellular wireless technologies, local area network wireless technologies, such as Wi-Fi®, or other wireless technologies such as Bluetooth®, ZigBee®, or the like. Alternatively, the user device 12 may interact with a local device, such as a smartphone, which has network access to the network 20. The network 20 may comprise any proprietary or public network, or combination thereof, that facilitate communications between the various elements discussed herein.

The user device 12 may also include a microphone 22, and/or an input port to facilitate the connection of the microphone 22 thereto, to enable the user device 12 to process sounds, such as a voice of the user 14. Similarly, the user device 12 may include a speaker 24, or an output port to facilitate the connection of the speaker 24 thereto, to enable the user device 12 to emit sounds, such as a voice of a called party, to the user 14.

The user device 12 may also include a user interface (UI) control module 26 that may provide certain functionality, as described in greater detail herein, in response to inputs of the user 14. The inputs may be provided by the user 14 via any one or more of a variety of different mechanisms, such as, by way of non-limiting example, voice, soft buttons implemented via a touch screen, mechanical buttons or other "hard" input mechanisms implemented on the user device 12 (not illustrated), and the like. In some embodiments, as will be discussed in greater detail herein, the user device 12 may include a browser module 28 that facilitates some of the functionality described herein.

The system 10 also includes an automated contact center device (ACCD) 30. Among other features, the ACCD 30 operates to receive calls from user devices, such as the user device 12, and facilitate a connection between the user device 12 and agent device 32-1-32-N (generally, agent devices 32) so that a particular agent 34 can provide the desired support to the user 14. The term "call" as used herein is not limited to traditional voice calls, and includes any type of interactive session request that may be used to initiate, or establish, an interactive session, which may comprise, by way of non-limiting example, a voice session, a video session, a text chat session, or the like. The ACCD 30 includes one or more communication interfaces 36 that facilitate communications with the network 20 using any desired communication technology. An agent processing module 37 includes certain functionality associated with processing an incoming call to identify a particular agent 34 who will handle the call. In some embodiments, the ACCD 30 may communicate, at least in part, with the user device 12 via the WebRTC protocol. The ACCD 30 may implement the WebRTC protocol via a WebRTC module 38 that communicates with the browser module 28 that executes on the user device 12. However, it is noted that the communications discussed herein between the user device 12 and the ACCD 30 may be implemented using any desired protocol or suite of protocols, and the embodiments are not limited to the use of the WebRTC protocol or any specific WebRTC interaction format or technology.

The ACCD 30 may also include, or be communicatively coupled to, a storage 40, such as a hard-drive or network-attached storage device, that includes text stream data 42. The text stream data 42 includes, for example, text stream category information 44 that identifies text stream categories of a plurality of text streams 46-1-46-N (generally, text streams 46) that may also be stored in the storage 40. The text streams 46 comprise a collection of related textual components, such as words, that have been categorized into a particular text stream category based on the content of the words. The text stream categories may categorize the text streams 46 in any desired manner, such as topic, genre, type of written material, or the like. By way of non-limiting examples, the text stream categories might include a business news category, an entertainment news category, a public domain book category, a sports news category, and a technology news category. The text stream category information 44 may also include category labels that can be provided to the user 14 on the display 16 to facilitate selection of a particular text stream category by the user 14.

In some embodiments, the ACCD 30 may process external content to generate suitable text streams 46. For example, the ACCD 30 may access one or more web servers 48-1-48-N (generally, web servers 48) to obtain a web page, and process the web page to remove non-textual content, such as images, and otherwise suitably format the web page, to thereby generate a text stream 46. In particular, the text stream data 42 may include cross-reference information that cross references a text stream category with a particular web server 48. Upon receipt of a selection of a particular text stream category by the user 14, the ACCD 30 may access the text stream data 42, determine a particular web server 48 that contains web pages that include content in the particular text stream category, and request one or more of such web pages from the particular web server 48. The ACCD 30 may then process the web pages to generate one or more text streams 46.

Figure 2:
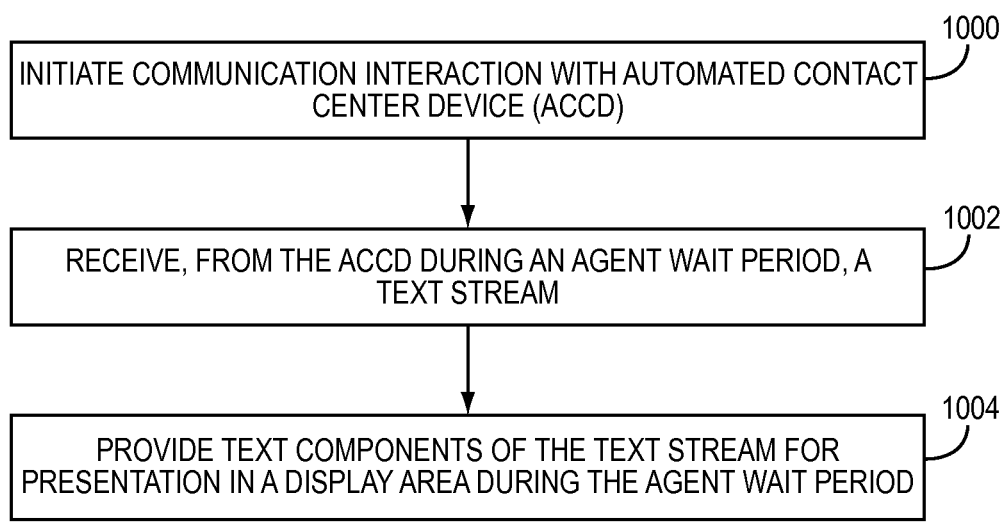
FIG. 2 is a flowchart of a process for providing a user with a text stream from the perspective of a user device according to one embodiment.

FIG. 2 is a flowchart of a process for providing the user 14 with a text stream 46 from the perspective of the user device 12, according to one embodiment. FIG. 2 will be discussed in conjunction with FIG. 1, such that element reference numbers discussed herein refer to elements illustrated in FIG. 1. Preliminarily, solely for purposes of illustration, assume that the user 14 desires to contact an entity (not illustrated) to obtain technical support information for a product owned by the user 14 and manufactured by the entity. The entity has provided a contact number, such as a telephone number, by which the user 14 can obtain such support. The user 14 initiates, via the user device 12, a call to the telephone number, which is answered by the ACCD 30, thereby establishing a communication interaction between the user device 12 and the ACCD 30 (FIG. 2, block 1000). The communication interaction may comprise a circuit-switched communication session, a Session Initiation Protocol (SIP) communication session, a WebRTC session, or the like. At some point during the communication interaction, an agent wait period begins in which the user 14 awaits the availability of an agent 34. The user device 12 receives, from the ACCD 30 during the agent wait period, a text stream 46 (FIG. 2, block 1002). The user device 12 provides text components of the text stream 46, such as words, for presentation in a display area of the display 16 during the agent wait period (FIG. 2, block 1004).

Figure 3:
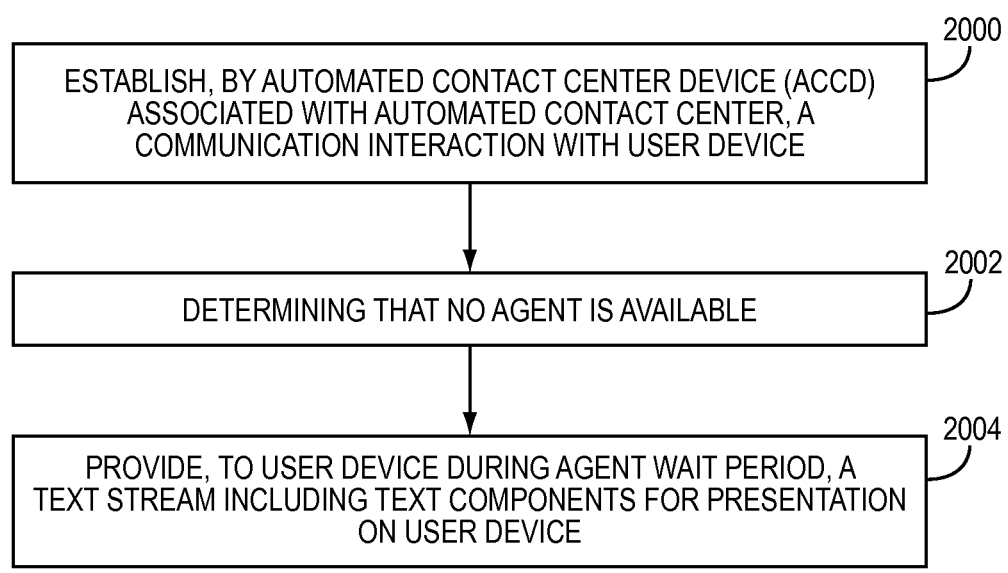
FIG. 3 is a flowchart of a process for providing the user with a text stream from the perspective of an automated contact center device (ACCD) according to one embodiment.

FIG. 3 is a flowchart of a process for providing the user 14 with a text stream 46 from the perspective of the ACCD 30, according to one embodiment. FIG. 3 will be discussed in conjunction with FIG. 1, such that element reference numbers discussed herein refer to elements illustrated in FIG. 1. Assume, as discussed above with regard to FIG. 2, that the user 14 desires to contact an entity (not illustrated) to obtain technical support information for a product owned by the user 14 and manufactured by the entity. The entity has provided a contact number, such as a telephone number, by which the user 14 can obtain such support. The user 14 initiates, via the user device 12, a call to the telephone number, which is associated with the ACCD 30. In response to receiving the call, the ACCD 30 establishes a communication interaction with the user device 12 (FIG. 3, block 2000). The ACCD 30 may then interact with the user 14 via the user device 12, such as by asking one or more questions to aid the ACCD 30 in determining a particular agent 34 or pool of agents 34 that can provide support to the user 14. The ACCD 30 may then determine that no agent 34 is immediately available to provide support to the user 14, and that an agent wait period will therefore be necessary (FIG. 3, block 2002).

The ACCD 30 may then select a text stream 46 to provide to the user device 12 for presentation to the user 14 during the agent wait period. The ACCD 30 may select the text stream 46 based on one or more criterion. For example, as discussed in greater detail below, the ACCD 30 may receive a text stream category selection from the user device 12 that identifies a text stream category selected by the user 14. Alternatively, the ACCD 30 may contain a profile regarding the user 14 based on known attributes of the user 14, such as age, race, sex, geographic location, preferences, and the like, and select a text stream 46 based on such known attributes. The profile may also identify one or more previous text stream categories selected by the user 14, or, in some embodiments, the user 14 may be able to configure the profile, such as via the browser module 28, to identify one or more preferred text stream categories. The ACCD 30 provides the selected text stream 46 to the user device 12 for presentation to the user 14 on the user device 12 during the agent wait period (FIG. 3, block 2004).

Figure 4:
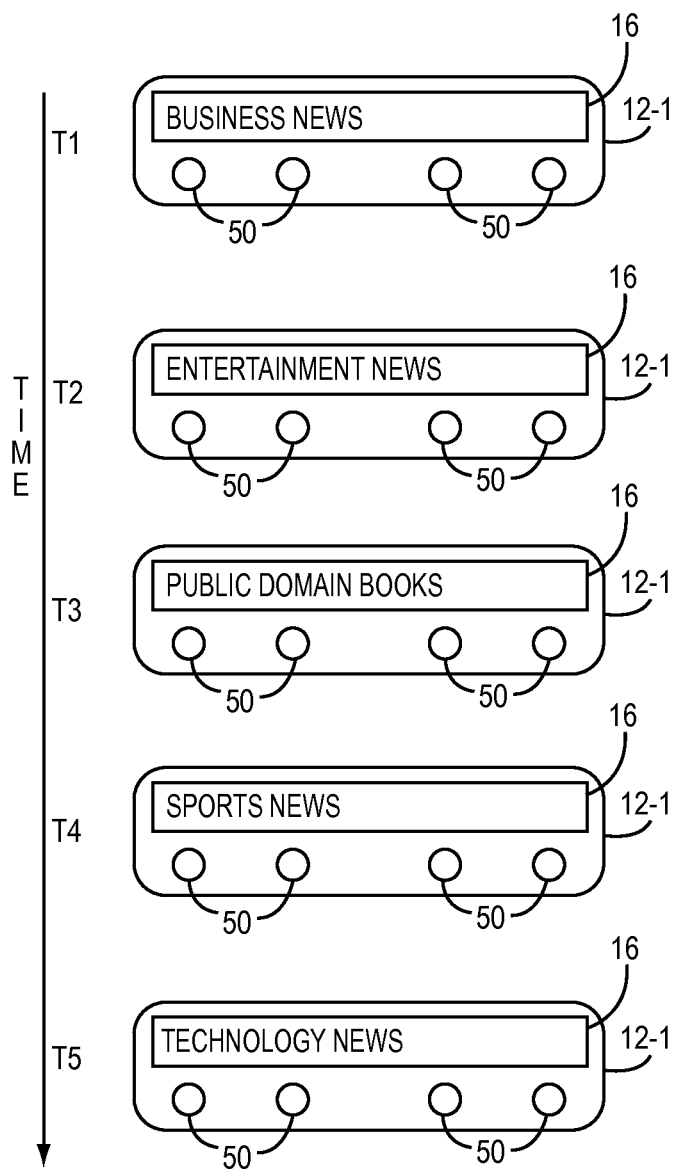
FIG. 4 is a block diagram illustrating a user device at a plurality of successive times during an agent wait period according to one embodiment.

FIG. 4 is a block diagram illustrating a user device 12-1 at a plurality of successive times during an agent wait period according to one embodiment. Except as otherwise stated herein, the user device 12-1 may be substantially similar to the user device 12 discussed above. The user device 12-1 has a display area that comprises an entire display 16 and that is capable of concurrently presenting a plurality of text components, such as words, to the user 14. In one example, the text components comprise words that are scrolled on the display 16 such that previously displayed words are removed from the left side of the display 16, and new words that are successive in a text stream 46 are added to the right side of the display 16. It will be appreciated that the direction that words move across the display 16 may differ depending on language and or culture. In other embodiments multiple words may be concurrently provided for presentation in the display area of the display 16. Thus, the text components comprise sets of words that will fit within the display area of the display 16 concurrently. In yet other embodiments, the text components may comprise letters, or characters, used to form words. Additionally, the embodiments may be utilized in conjunction with streaming technology, such as that available, by way of non-limiting example, by Spritz Technology, Inc., a Delaware corporation having a place of business at 35 Maple Street, Stoneham, Mass. 02180, United States.

The user device 12-1 includes four input controls 50 which may be utilized by the user 14 to interact with the user device 12-1. In one embodiment, the user device 12-1 may also include a front lens through which a camera contained within the user device 12-1 (not illustrated) can capture imagery of the user 14, as will be discussed in greater detail herein.

In this example, assume that the user 14 has entered an agent wait period. In some embodiments, at the beginning of the agent wait period, the ACCD 30 may provide to the user device 12-1 commands that may be utilized by the user 14 to effect the presentation of a text stream, including, for example, a command that requests a list of available text stream categories. The user device 12-1 presents the commands on the display 16. In this example, the user 14 has requested a list of available text stream categories. The request may be made via an input control 50, or via an audible request via the microphone 22, for example. The request may be made in conjunction with the display of available commands, such that selection of an input control 50 while a particular command is being presented on the display 16 constitutes selection of the particular command. The user device 12-1 communicates the request for text stream categories to the ACCD 30. The user device 12-1 receives a plurality of text stream categories. The user device 12-1 presents the text stream categories on the display 16-1. For example, at times T1-T5, the user device 12-1 presents the test stream categories "BUSINESS NEWS," "ENTERTAINMENT NEWS," "PUBLIC DOMAIN BOOKS," "SPORTS NEWS," and "TECHNOLOGY NEWS," respectively.

Assume that at time T5, the user 14 selects an input control 50. The user device 12-1 determines that the text stream category that is currently presented on the display 16 is the "TECHNOLOGY NEWS" text stream category. The user device 12-1 communicates data that identifies the "TECHNOLOGY NEWS" text stream category to the ACCD 30. The ACCD 30 accesses a text stream 46, or generates a text stream 46 based on, for example, a web page of a web server 48 that is in the "TECHNOLOGY NEWS" text stream category, and provides the text stream 46 to the user device 12-1 for presentation to the user 14. The user device 12-1 presents the text stream 46 on the display 16 to the user 14 during the agent wait period. As discussed above, the presentation may comprise, for example, scrolling words of the text stream 46 across the display 16 at a particular pace. Alternatively, sets of words of the text stream 6 may be concurrently presented on the display 16-1 at a particular pace.

Figure 5:
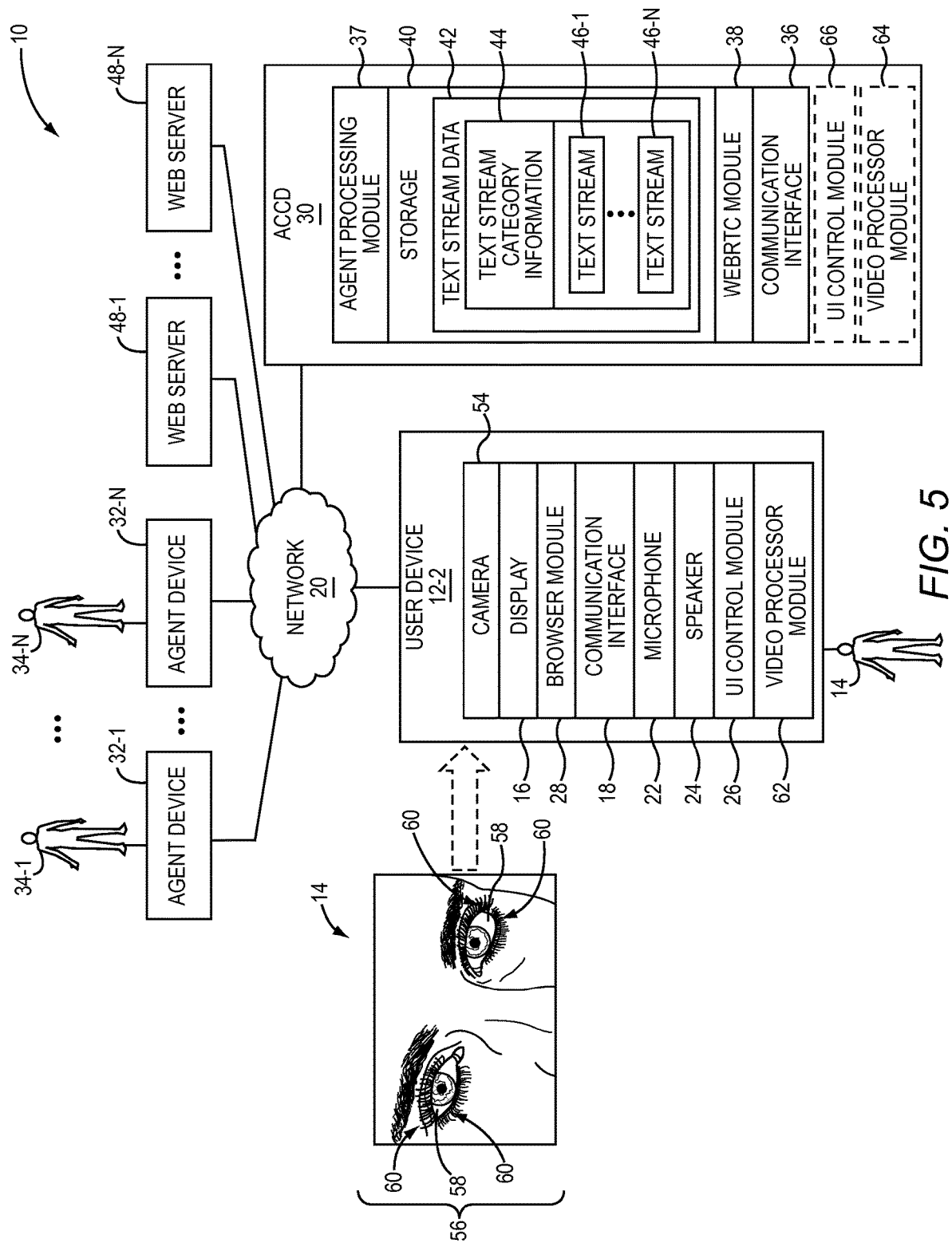
FIG. 5 is a block diagram of the system illustrated in FIG. 1 according to another embodiment.

FIG. 5 is a block diagram of the system 10 illustrated in FIG. 1 according to another embodiment. In this embodiment, a user device 12-2 includes a viewer-facing camera 54 that can generate video imagery at a framerate, such as 30 or 60 frames per second as non-limiting examples, of a desired scene, including, for example, an eye system 56 of the user 14. The eye system 56 may include one or two eyes 58, and corresponding eyelids 60. In operation of the user device 12-2, a front lens of the camera 54 is oriented in a direction toward the user 14 to facilitate capturing the eye system 56 when the user 14 is viewing the display 16. To facilitate eye control detection in low light conditions, the user device 12-2 may include a light source that is not disruptive to the user 14, such as an infrared (IR) light source, to illuminate the eye system 56. The camera 54 may include a sensor that is sensitive to photons in both visible wavelengths as well as IR wavelengths, and thus be capable of capturing the eye system 56 under normal lighting conditions, as well as reflections of IR energy in low light conditions.

A video processor module 62 is coupled to the camera 54 and is configured to process the video imagery and identify movements of the eye system 56. Such movements may comprise any desired actions, including, by way of non-limiting example, changing a direction of a gaze of any eye 58, such as right-to-left or up-to-down, closing of a single eyelid 60 or both eyelids 60 for a predetermined period of time, blinking an eyelid 60 a predetermined number of times within a predetermined period of time, or the like. While several examples have been provided, the embodiments are not limited to any particular movements of the eye system 56, and the video processor module 62 may be configured to detect and identify any desired movement of the eye system 56.

The UI control module 26 receives, from the video processor module 62, the identification of a particular eye control movement, and translates the eye control movement into a control command, sometimes referred to herein as a stream control command, or referred to simply as a control command. Control commands may comprise, by way of non-limiting example, a pause control command, a continue control command, an increase pace control command, a decrease pace control command, a next text control command, a previous text control command, a back up control command, a jump forward control command, and a display text categories control command. It will be appreciated that the control commands provided herein are merely examples, and any desired manipulation of text provided on the display 16 may be implemented by the UI control module 26.

In one embodiment, the video processor module 62 may identify to the UI control module 26 a detected eye movement with a predetermined value that is passed or otherwise provided to the UI control module 26. As an example, the UI control module 26 may receive a numeric value of 2 from the video processor module 62 that indicates, for example, that the video processor module 62 detected that an eyelid 60 of the user 14 remained closed for three seconds. The UI control module 26 may translate this eye control movement into a pause control command, and thereafter the user device 12-2 may immediately pause the current text stream 46 being presented on the display 16.

The video processor module 62 analyzes the eye system 56 of the user 14 concurrently while the text components of a text stream 46 are being provided for presentation on the display 16 to determine if the eye system 56 has initiated a control command. Specifically, the video processor module 62 is configured to detect a change in direction of a gaze of one or both eyes 58, and/or movement of the eyelids 60. The video processor module 62 then identifies such eye control movement to the UI control module 26. The UI control module 26 translates, or otherwise determines, a particular control command based on the eye control movement. Control commands can change characteristics of how the text stream 46 is presented on the display 16, and can comprise, by way of non-limiting example, pausing the text components, continuing the text components (when previously paused), increasing a pace at which the text components are provided on the display 16, decreasing a pace at which the text components are provided on the display 16, requesting a next text stream 46, requesting a previous text stream 46, backing up to an earlier location of the text stream 46, presenting the available text stream categories. Once a control command is received, the user device 12-2 alters the presentation of the text components in accordance with the control command. In this manner, the user device 12-2 facilitates eye control of the text streams 46 in a manner that is intuitive, requires very little physical space of the user device 12-2, and does not require physical manipulation by the user 14 of the user device 12-2.

In another embodiment, some of the functionality described above is provided by the ACCD 30 when in communication with the user device 12-2. In this embodiment, a video processor module 64 on the ACCD 30 analyzes video imagery of the eye system 56 of the user 14 that is provided to the ACCD 30 by the user device 12-2. The video processor module 64 operates substantially similarly to the video processor module 62 described above, except as otherwise stated herein.

A UI control module 66 receives, from the video processor module 64, the identification of a particular eye control movement, and translates the eye control movement into a control command. In one embodiment, the ACCD 30 communicates with the user device 12-2 via the WebRTC protocol. In this embodiment, the ACCD 30 establishes a communication interaction that includes the creation of a text channel between the ACCD 30 and the user device 12-2. The ACCD 30 also establishes a video channel between the ACCD 30 and the user device 12-2. The establishment of the text channel and video channel may be accomplished, in some embodiments, by appropriate WebRTC commands and/or messages. The ACCD 30 provides the text components of a text stream 46 via the text channel to the user device 12-2 for presentation on the display 16. Substantially concurrently therewith, the user device 12-2 begins providing a video stream via the video channel to the ACCD 30 that depicts the eye system 56 of the user 14. The user device 12-2 provides the text components of the text stream 46 for presentation on the display 16. The ACCD 30 determines, based on an analysis of the video stream, a control command that requests a change in a characteristic in the presentation of the text components on the display 16. As discussed above, the determination of the control command is based on a detection, by the video processor module 64, of an eye movement of the eye system 56 that is depicted in the video stream received from the user device 12-2.

The requested change in characteristic can comprise any suitable control command, including, as discussed above, a pause control command, a continue control command, an increase pace control command, a decrease pace control command, a next text control command, a previous text control command, a back up control command, a jump forward control command, or a display text categories control command.

In response to the control command, the ACCD 30 provides subsequent text components to the user device 12-2 via the text channel in a manner that implements the requested change in characteristic in accordance with the control command. For example, if the control command comprises a pause control command, the ACCD 30 may halt providing text components to the user device 12-2. If the control command comprises a continue control command, the ACCD 30 may continue providing successive text components to the user device 12-2. If the control command comprises a back up control command, the ACCD 30 may back up a predetermined number of text components, and provide such text components, and successive text components, to the user device 12-2. If the control command comprises a jump forward control command, the ACCD 30 may move forward a predetermined number of text components, and provide such text components, and successive text components, to the user device 12-2. If the control command comprises an increase pace control command, the ACCD 30 may increase a pace at which the ACCD 30 provides text components to the user device 12-2. If the control command comprises a next text stream control command, the ACCD 30 may halt providing a current text stream 46 to the user device 12-2 and begin providing a next text stream 46 to the user device 12-2.

Figure 6:
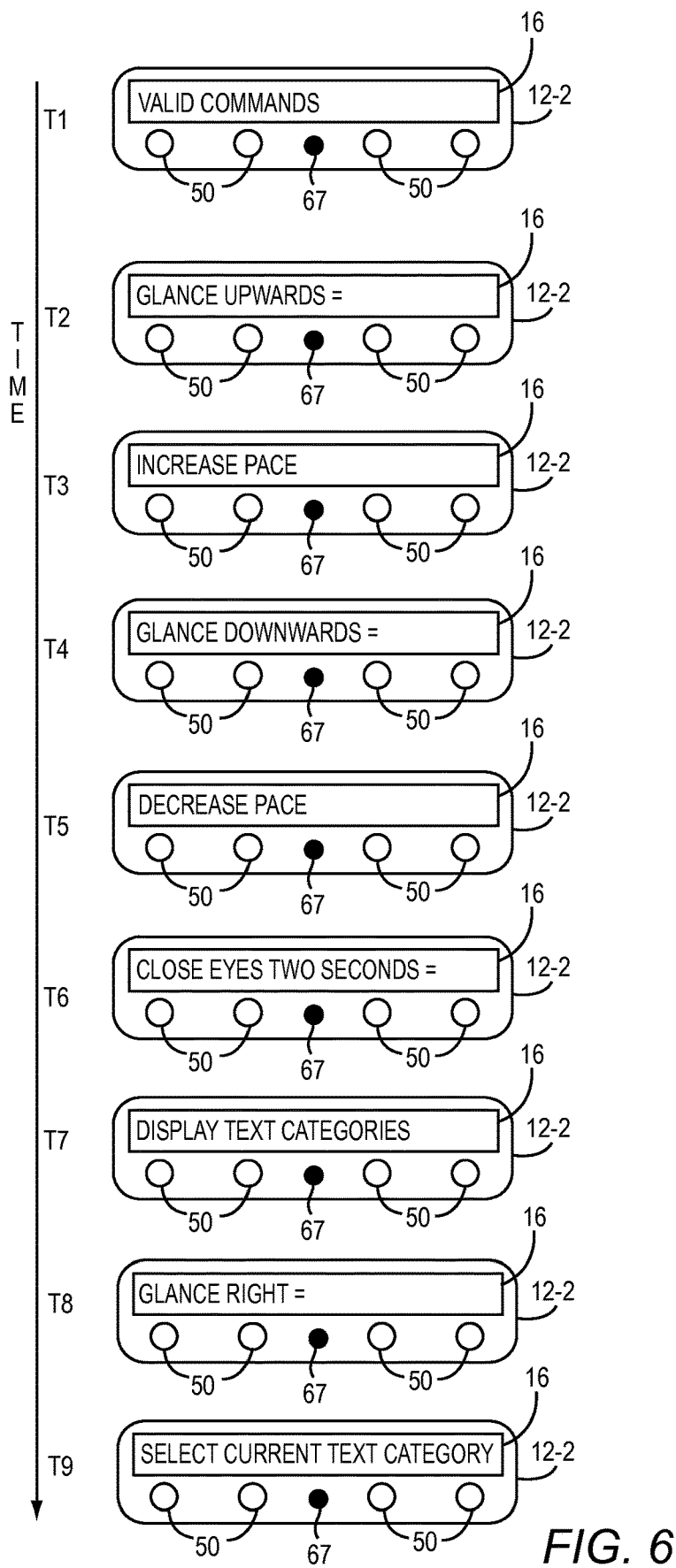
FIG. 6 is a block diagram illustrating a user device at a plurality of successive times according to one embodiment.

FIG. 6 is a block diagram illustrating the user device 12-2 at a plurality of successive times, according to one embodiment. The user device 12-2 includes a front lens 67 that facilitates the generation of imagery of the eye system 56 by the camera 54 (not illustrated). In this example, at the beginning of an agent wait period, the ACCD 30 provides to the user device 12-2 text that identifies valid control commands that may be implemented via the eye system 56 of the user 14. The user device 12-2, over successive periods of time T1-T9, for example, presents such text to the user 14. In this example, the text identifies a glance upwards as constituting an increase pace control command (times T2-T3). An increase pace control command causes the pace at which text components of a text stream 46 are presented on the display 16 to be increased. The text also identifies a glance downwards as constituting a decrease pace control command (times T4-T5). A decrease pace control command causes the pace at which text components of a text stream 46 are presented on the display 16 to be decreased. The text identifies the closure of the eyes 58 for two seconds as constituting a display text categories control command (times T6-T7). A display text categories control command causes the ACCD 30 to provide the available text categories to the user device 12-2 for presentation to the user 14. The text identifies a glance to the right of the eyes 58 as constituting a select current text category control command (times T8-T9). A select current text category control command selects the current text category being displayed on the display 16 during the presentation of the available text categories.

Figure 7:
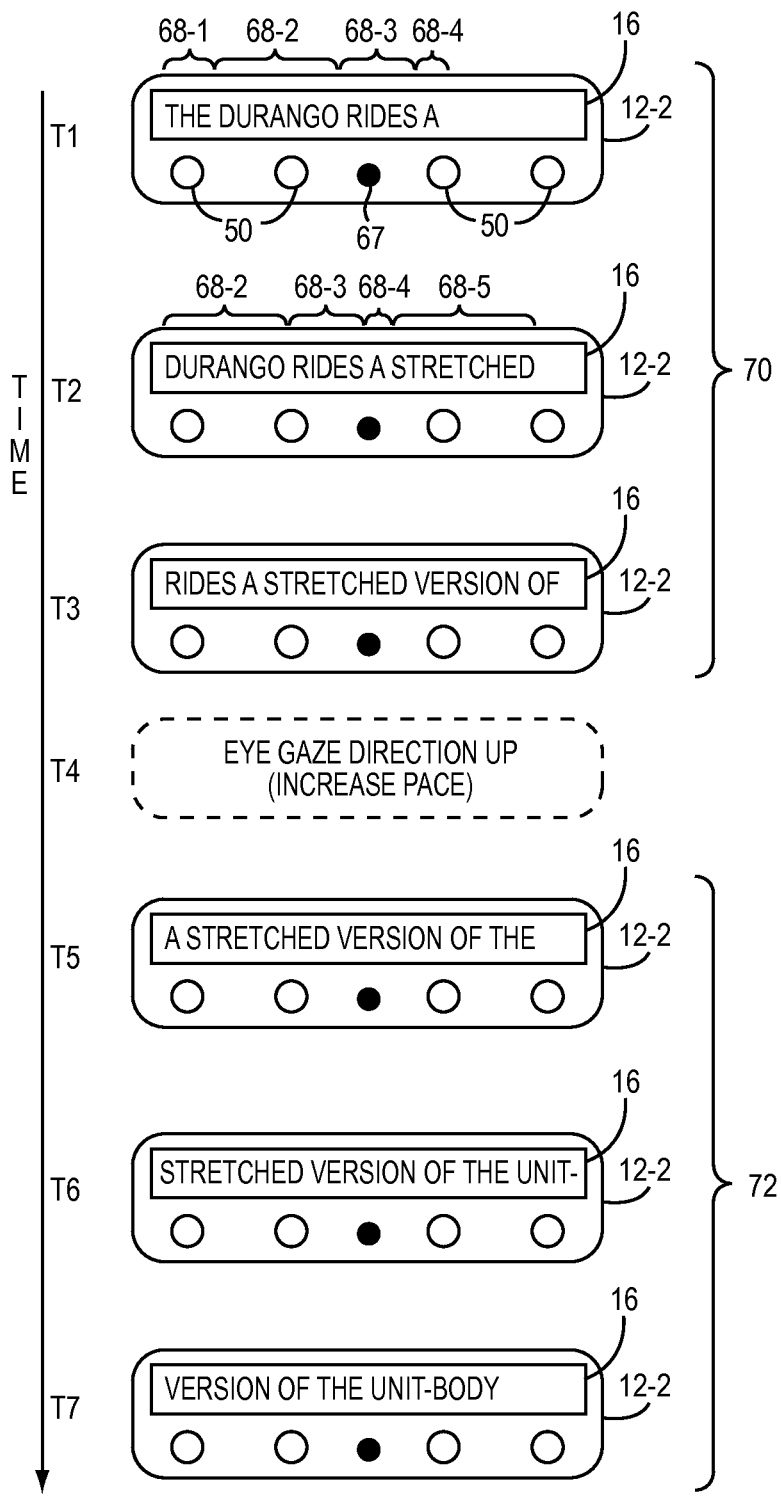
FIG. 7 is a block diagram illustrating a user device at a plurality of successive times according to another embodiment.

FIG. 7 is a block diagram illustrating the user device 12-2 at a plurality of successive times according to another embodiment. In one example, the text components comprise words that are scrolled on the display 16 such that previously displayed words are removed from the left side of the display 16, and new words that are successive in a text stream 46 are added to the right side of the display 16. It will be appreciated that the direction that words move across the display 16 may differ depending on language and/or culture. The user device 12-2 includes four input controls 50 which may be utilized by the user 14 to interact with the user device 12-2. The user device 12-2 also includes the front lens 67 through which the camera 54 can capture the eye system 56 of the user 14 (not illustrated).

For purposes of illustration, assume that the user 14 has indicated a desire for a text stream 46 in an Automobile text stream category. The ACCD 30 selects a text stream 46 that is in the Automobile text stream category, and provides it to the user device 12-2 for presentation to the user 14. At a time T1, the user device 12-2 presents text components 68-1-68-4 on the display 16 for the user 14. In this example, the text components 68-1-68-4 are the first four words of an automobile review. At a time T2, the text component 68-1 is removed from the display 16; the text components 68-2-68-4 are shifted to the left; and a next successive text component 68-5 is added to the rightmost part of the display 16. This process repeats at time T3. During a period of time 70 from time T1 through time T3, the text components 68 may be scrolled on the display 16 at a first pace. For example, the first pace may comprise 200 words per minute, such that 200 words will be scrolled across the display 16 per minute. While the text components 68 are being scrolled across the display 16, the video processor module 62 (FIG. 5) is analyzing the eye system 56 of the user 14 by processing the video imagery generated by the camera 54.

At a time T4, the video processor module 62 detects an eye control movement wherein the user 14 moves her gaze in an upward direction. The UI control module 26 interprets this eye control movement as an increase pace control command. The user device 12-2 increases the pace of presenting the text components 68 from the first pace to a second, faster pace. The rate at which the pace is increased may be set by the user device 12-2, or may be configurable by the user 14. Assume that each increase pace stream control command is configured to increase the pace by 30 words per minute. During a period of time 72 that includes times T5, T6, and T7, the user device 12-2 increases the pace of presenting the text components 68 such that the text components 68 are scrolled across the display 16 at a pace of 230 words per minute. Each additional upward gaze by the user 14 may increase the pace by an additional 30 words per minute. Similarly, each downward gaze may decrease the pace by 30 words per minute. Thus, the user 14 can easily control the pace at which the text components 68 are presented on the display 16 without manually manipulating the user device 12-2, or otherwise moving her hands.

Figure 8:
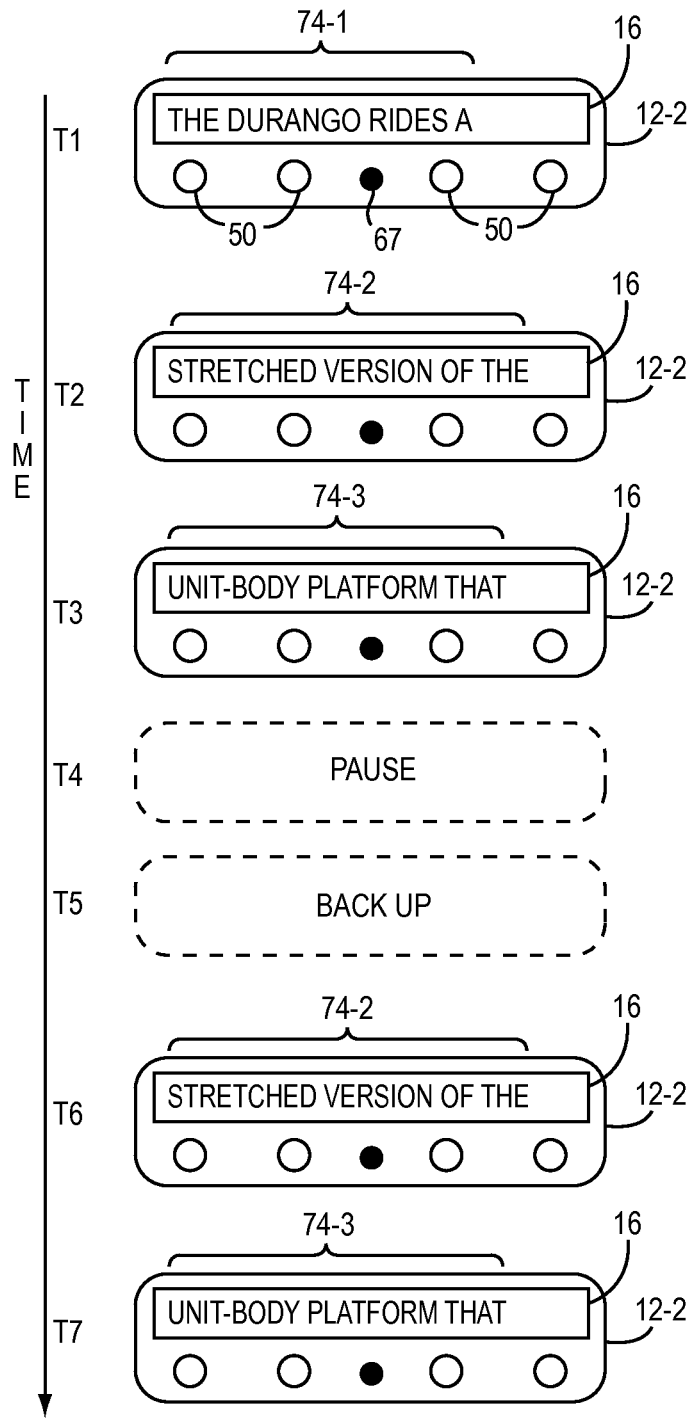
FIG. 8 is a block diagram illustrating a user device at a plurality of successive times according to another embodiment.

FIG. 8 is a block diagram illustrating the user device 12-2 at a plurality of successive times, according to another embodiment. In this embodiment, a plurality of words is instantaneously provided for presentation in the display area of the display 16. Thus each text component 74-1-74-3 comprises a set of words that will fit within the display area of the display 16. The text component 74-1 comprises the four words "THE DURANGO RIDES A," which are displayed concurrently on the display 16 at a time T1. At a time T2, the text component 74-1 is replaced with the text component 74-2, which comprises the next successive set of words in the respective text stream 46, and which follows the words in the text component 74-1. This process repeats at a time T3. The text components 74-1-74-3 are presented on the display 16 at a particular pace, as discussed above with respect to FIG. 3. The pace may be altered in response to an appropriate eye control movement, as discussed above.

At a time T4, the user device 12-2 determines that the user 14 has performed, via the eye system 56, an eye control movement that translates to a pause control command. The eye control movement may comprise, by way of non-limiting example, keeping an eyelid 60 closed for a predetermined period of time. Alternatively, the eye control movement may comprise, by way of non-limiting example, blinking an eyelid 60 a predetermined number of times within a predetermined period of time.

In some embodiments, the association of a particular eye control movement, or action, with a particular stream control command may be user configurable. In other embodiments, the association of a particular eye control movement, or action, with a particular control command may be system dependent and unconfigurable.

In response to the eye control movement, the user device 12-2 stops the presentation of successive text components 74-1-74-3 in the display area of the display 16. At a time T5 the user device 12-2 then determines that the user 14 has performed, via the eye system 56, another eye control movement that translates into a back up control command. Again, as discussed above, the eye control movement may comprise any detectable movement of the eye system 56 of the user 14. In response to the back up control command, the user device 12-2 determines a current text component 74, in this example the text component 74-3, that was last provided for presentation in the display area of the display 16. The user device 12-2 then identifies a previous text component 74 that was previously provided for presentation in the display area. The particular number of previous text components 74 that are skipped in response to the back up control command may be system controlled, or may be configurable by the user 14. In this example, assume that each back up control command causes the user device 12-2 to back up the distance of a single text component 74 in the respective text stream 46. At a time T6, the user device 12-2 provides the previous text component 74-2 for presentation in the display area of the display 16, and this process continues at a time T7 with the next successive text component 74-3 being presented in the display area of the display 16.

Another example control command comprises a next text control command. Upon detecting an eye movement of the eye system 56 that translates into a next text control command, the user device 12-2 halts the presentation of the current text stream 46 that is being provided for presentation on the display 16. The user device 12-2 then requests from the ACCD 30 another text stream 46. The ACCD 30 selects another text stream 46 and communicates the text stream 46 to the user device 12-2. The user device 12-2 then provides text components of the next text stream 46 for presentation in the display area of the display 16.

Figure 9:
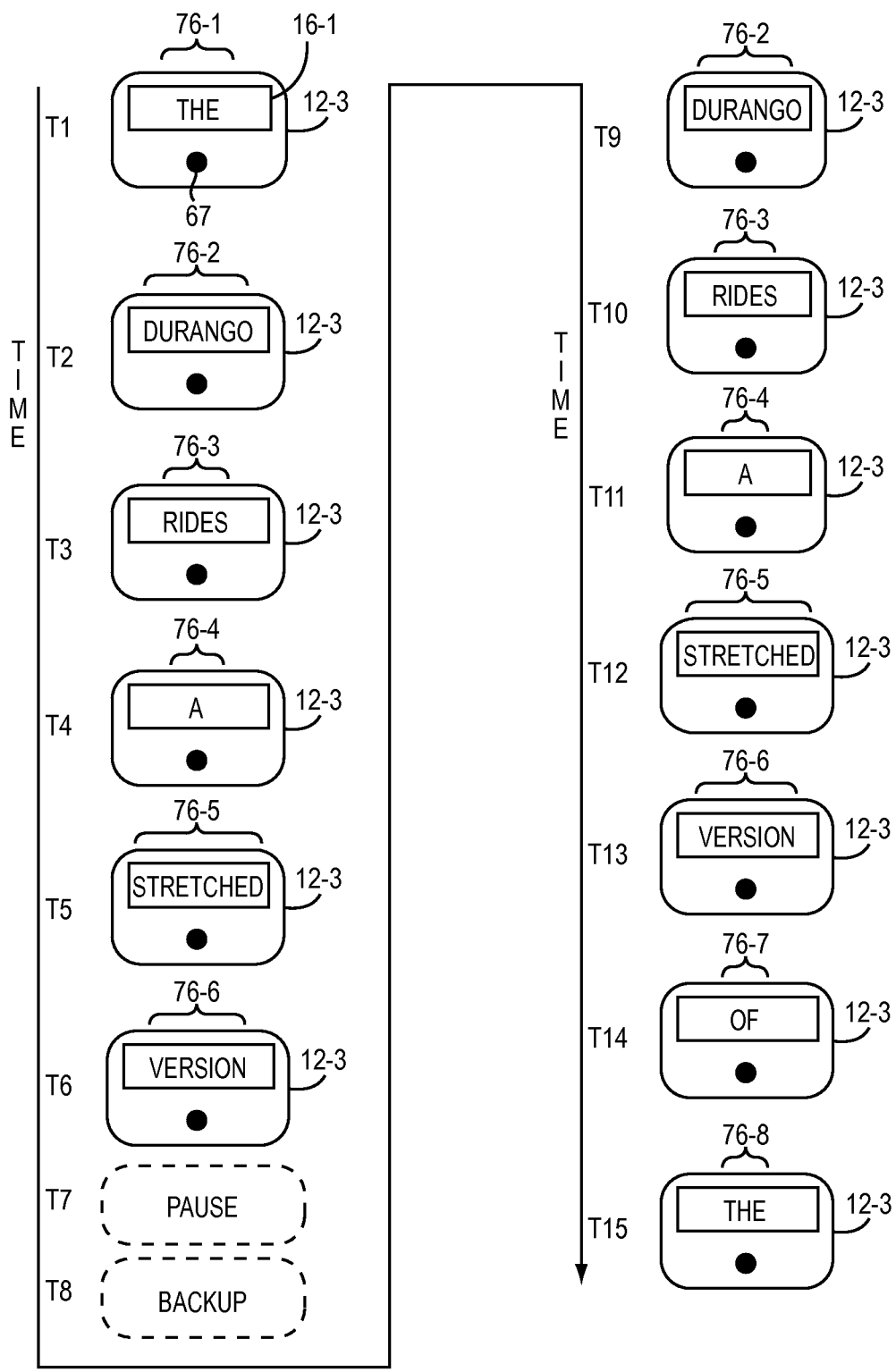
FIG. 9 is a block diagram illustrating a user device at a plurality of successive times according to another embodiment.

FIG. 9 is a block diagram of a user device 12-3 at a plurality of successive times according to another embodiment. Except as otherwise stated herein, the user device 12-3 may be substantially similar to the user devices 12, 12-1, and 12-2 discussed above, except as otherwise mentioned herein. The user device 12-3 comprises a relatively small display 16-1, as well as the front lens 67 that provides a scene to the camera 54 (not illustrated). The user device 12-3 provides for presentation on the display 16-1 a single word at a time, and thus the user device 12-3 may have a very small form factor. Each text component 76-1-76-8 (generally, text components 76) comprises a single word. The text components 76 may be provided for presentation on the display 16-1 at a particular pace, which, as discussed above, may be altered in response to appropriate eye control movements.

The user device 12-3 provides text components 76-1-76-6 for presentation on the display 16-1 at successive times T1-T6. At a time T7, the user device 12-3 detects an eye movement that translates into a pause control command. The user device 12-3 halts the presentation of text components 76 on the display 16-1. At a time T8, the user device 12-3 then determines that the user 14 has performed, via the eye system 56, another eye control movement that translates into a back up control command. As discussed above, the eye control movement may comprise any detectable movement of the eye system 56 of the user 14. In response to the backup stream control command, the user device 12-3 determines a current text component 76, in this example the text component 76-6, that was last provided for presentation in the display area of the display 16-1. The user device 12-3 then identifies a previous text component 76 that was previously provided for presentation in the display area. The particular number of previous text components 76 that are skipped in response to the back up control command may be system controlled, or may be configurable by the user 14. In this example, assume that each back up control command causes the user device 12-3 to back up the distance of four text components 76 in the respective text stream 46. At a time T9, the user device 12-3 provides the previous text component 76-2 for presentation in the display area of the display 16-1, and this process continues at time T10 with the next successive text component 76-3 being presented in the display area of the display 16-1. At times T11-T14, the user device 12-3 successively provides text components 76-4-76-8 for presentation on the display 16-1.

Figure 10:
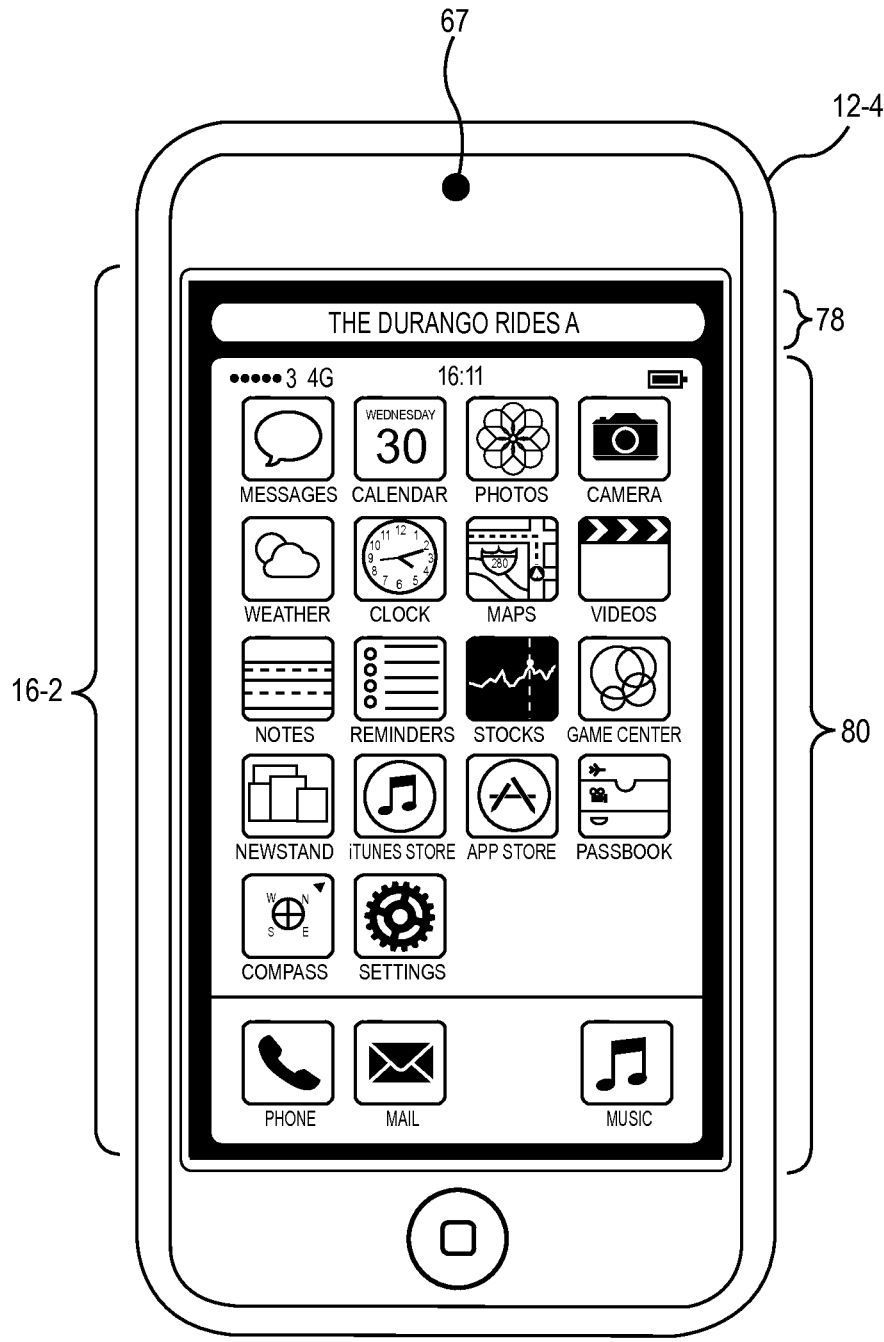
FIG. 10 is a block diagram of a user device according to another embodiment.

FIG. 10 is a block diagram of a user device 12-4 according to another embodiment. Except as otherwise stated herein, the user device 12-4 may be substantially similar to the user devices 12, and 12-1-12-3 discussed above. In this embodiment, the user device 12-4 comprises a smartphone. The user device 12-4 comprises a relatively large display 16-2 and includes the front lens 67 that provides a scene to the camera 54 (not illustrated). The display 16-2 includes a display area 78 in which embodiments discussed herein may be practiced, and a display area 80 in which other functionality may be provided, in some embodiment concurrently with providing the functionality described herein.

Figure 11A:
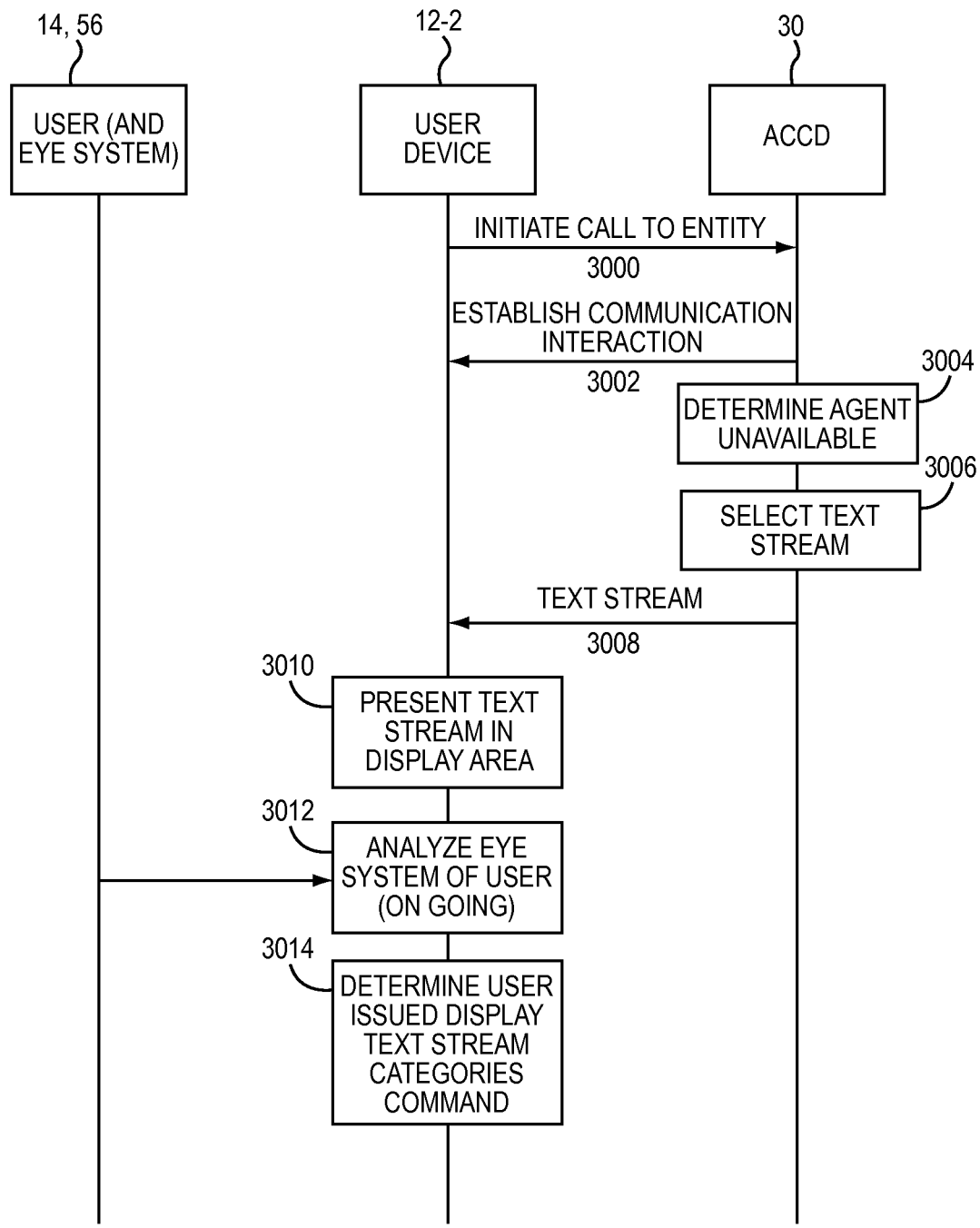
FIGS. 11A-11B are message flow diagrams that illustrate an example message flow between a user device and the ACCD according to one embodiment.
Figure 11B:
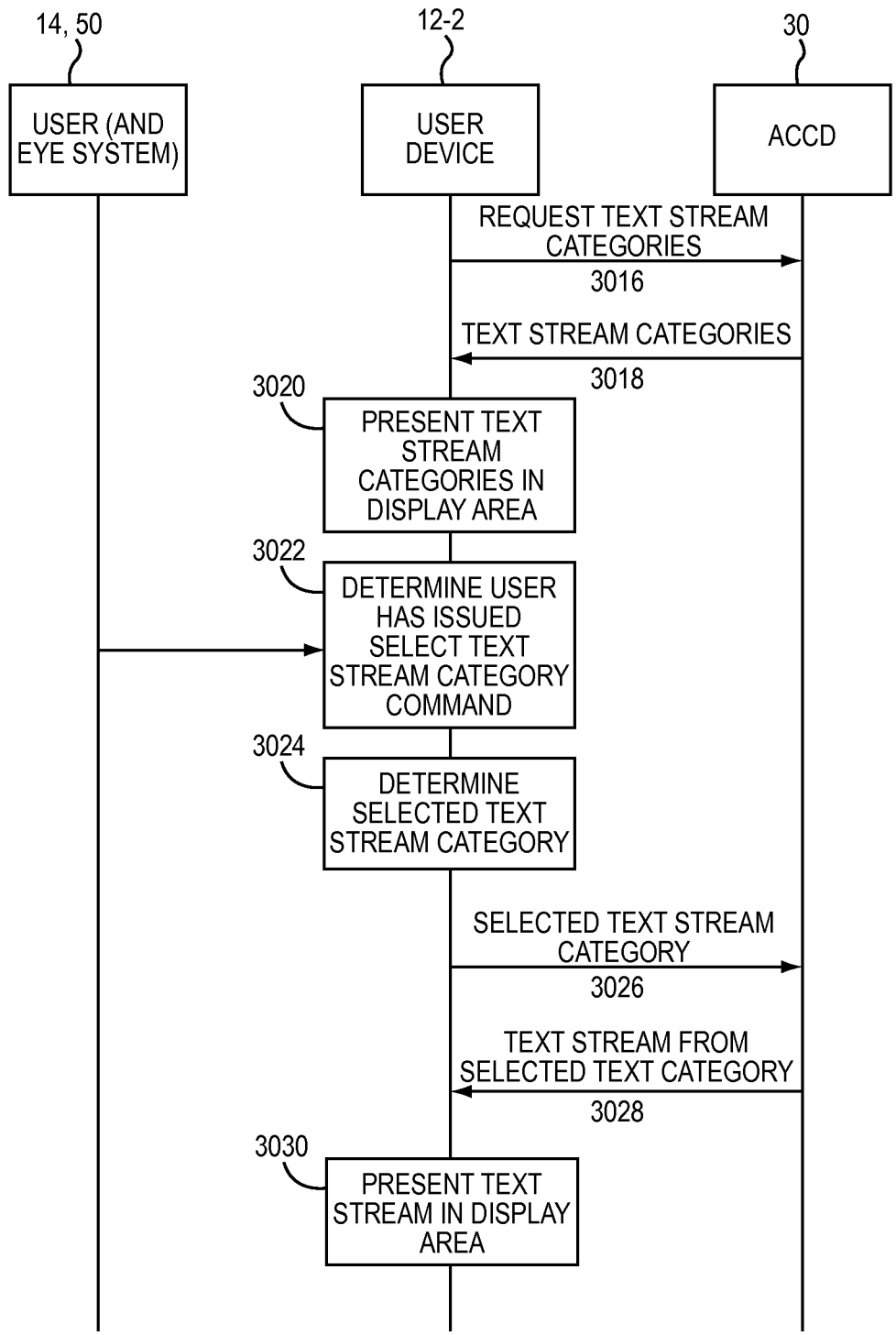

FIGS. 11A-11B are message flow diagrams that illustrate an example message flow between a user device, such as the user device 12-2, and the ACCD 30 according to one embodiment. The user 14 initiates a call via the user device 12-2 for support, which is directed to the ACCD 30 (step 3000). The ACCD 30 answers the call and establishes a communication interaction with the user device 12-2 (step 3002). After the ACCD 30 identifies an appropriate agent 34 or pool of agents 34, the ACCD 30 determines that none of such agents 34 are currently available, and that an agent wait time will commence (step 3004). The ACCD 30 selects a text stream 46, and provides the text stream 46 to the user device 12-2 (steps 3006-3008). The user device 12-2 receives the text stream 46 from the ACCD 30 and presents the text stream 46 on the display 16 during the agent wait period (step 3010).

On an ongoing basis, the user device 12-2 analyzes the eye system 56 of the user 14 (step 3012). At some point during the agent wait period, the user device 12-2 determines that the user 14 has issued a display text stream categories command (step 3014). In response, the user device 12-2 sends to the ACCD 30 a request for the text stream categories (step 3016). The ACCD 30 sends data identifying the text stream categories to the user device 12-2 (step 3018). The user device 12-2 receives the data and presents the text stream categories on the display 16 (step 3020). The user device 12-2 determines that the user 14 has issued a select text stream category command (step 3022). The user device 12-2 determines the selected text stream category (step 3024). In one embodiment, this determination may be made based on which text stream category was presented on the display 16 at the time the user 14 issued a select text stream category command.

The user device 12-2 sends data identifying the selected text stream category to the ACCD 30 (step 3026). The ACCD 30 selects a text stream 46 based on the selected text stream category, and sends the text stream 46 to the user device 12-2 for presentation to the user 14. The user device 12-2 presents the text stream 46 on the display 16 during the wait agent period.

Figure 12:
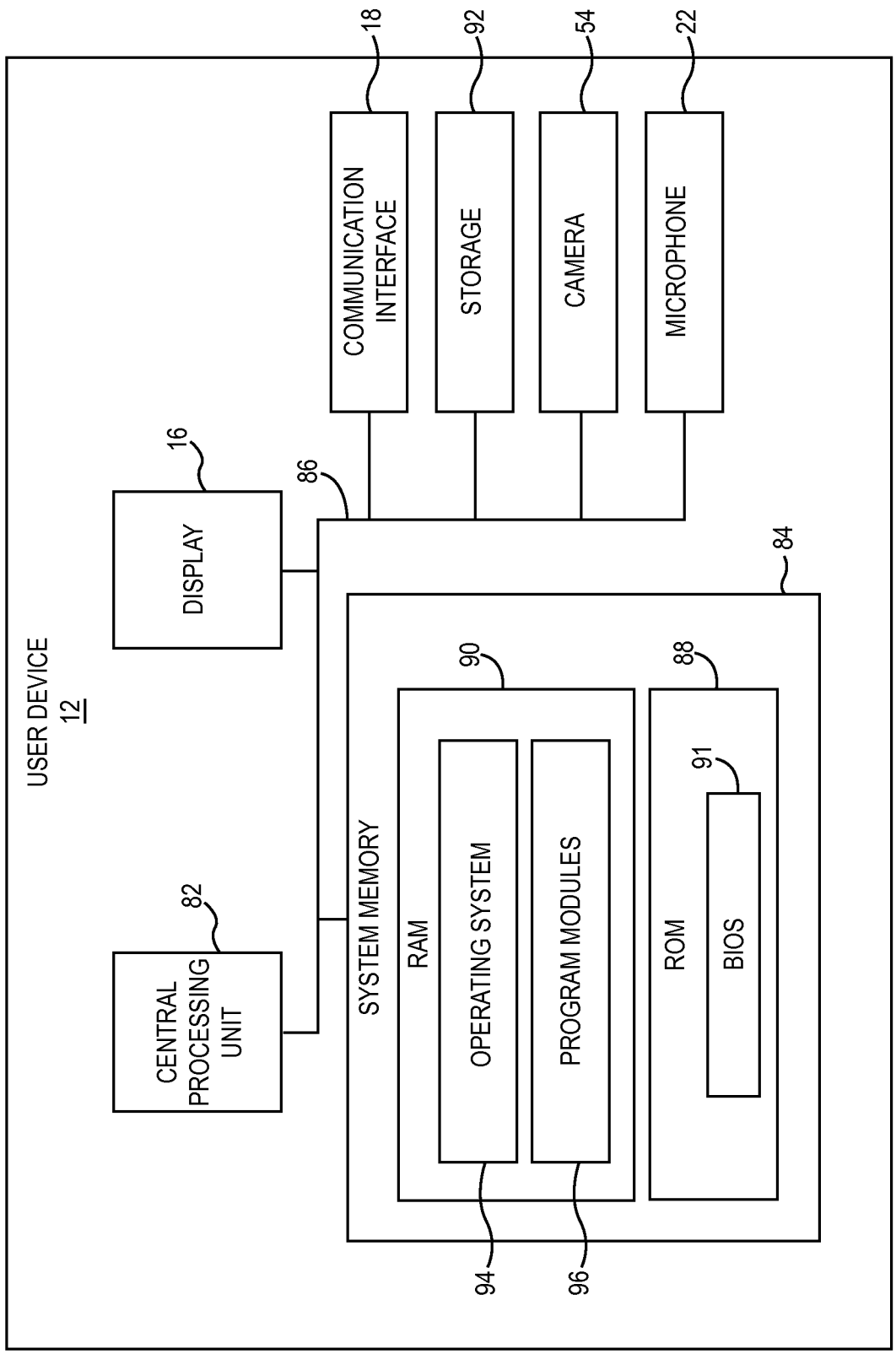
FIG. 12 is a block diagram of a user device according to one embodiment.

FIG. 12 is a block diagram of the user device 12 according to one embodiment. However, the elements discussed herein are equally suitable for implementing any of the user devices 12-1-12-4. The user device 12 may comprise any computing or processing device capable of including firmware, hardware, and/or executing software instructions to implement the functionality described herein, such as a smartphone, a computing tablet, a fitness device, a timekeeping device, a news or information device, or the like. The user device 12 includes a central processing unit 82, a system memory 84, and a system bus 86. The system bus 86 provides an interface for system components including, but not limited to, the system memory 84 and the central processing unit 82. The central processing unit 82 can be any commercially available or proprietary processor.

The system bus 86 may be any of several types of bus structures that may further interconnect to a memory bus (with or without a memory controller), a peripheral bus, and/or a local bus using any of a variety of commercially available bus architectures. The system memory 84 may include non-volatile memory 88 (e.g., read only memory (ROM), erasable programmable read only memory (EPROM), electrically erasable programmable read only memory (EEPROM), etc.) and/or volatile memory 90 (e.g., random access memory (RAM)). A basic input/output system (BIOS) 91 may be stored in the non-volatile memory 88, and can include the basic routines that help to transfer information between elements within the user device 12. The volatile memory 90 may also include a high-speed RAM, such as static RAM for caching data.

The user device 12 may further include or be coupled to a storage 92, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 92 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory, solid-state memory, cartridges, and the like, may also be used, and further, that any such media may contain computer-executable instructions for performing novel methods of the disclosed embodiments.

A number of modules can be stored in the computer-readable storage 92 and in the volatile memory 90, including an operating system 94 and one or more program modules 96, which may implement the functionality described herein in whole or in part, including, for example, functionality associated with the browser module 28, the video processor module 62, and UI control module 26.

All or a portion of the embodiments may be implemented as a computer program product stored on a transitory or non-transitory computer-usable or computer-readable storage medium, such as the computer-readable storage 92, which includes complex programming instructions, such as complex computer-readable program code, configured to cause the central processing unit 82 to carry out the steps described herein. Thus, the computer-readable program code can comprise software instructions for implementing the functionality of the embodiments described herein when executed on the central processing unit 82. The central processing unit 82, in conjunction with the program modules 96 in the volatile memory 90, may serve as a controller for the user device 12 that is configured to, or adapted to, implement the functionality described herein. The user device 12 also includes the communication interface 18, display 16, and optionally, the camera 54 and the microphone 22.

Figure 13:
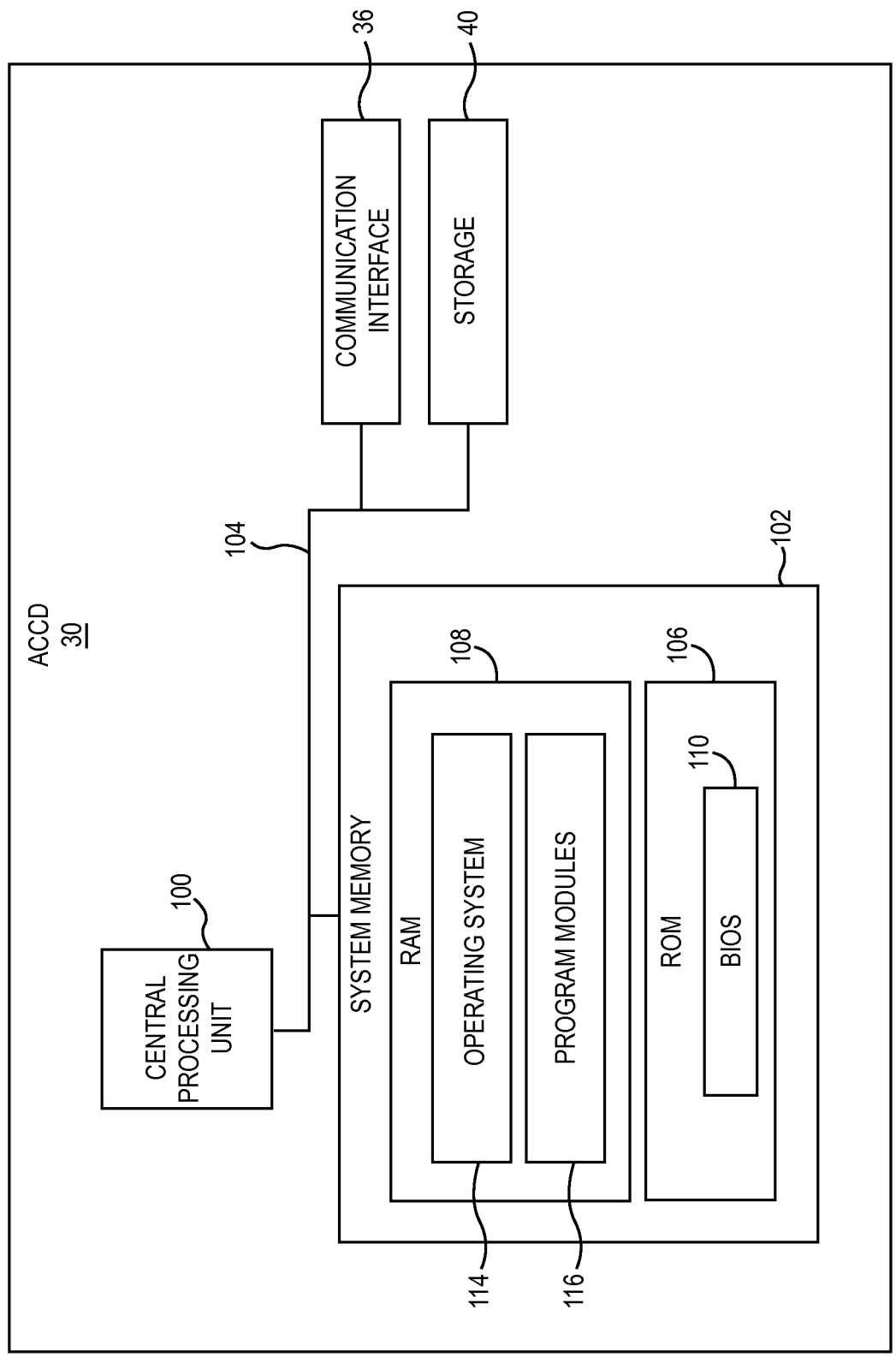
FIG. 13 is a block diagram of the ACCD according to one embodiment.

FIG. 13 is a block diagram of the ACCD 30 according to one embodiment. The ACCD 30 may comprise any computing or processing device capable of including firmware, hardware, and/or executing software instructions to implement the functionality described herein, such as a work station, desktop computer, telecommunications switch, server, laptop computer, or the like. The ACCD 30 includes a central processing unit 100, a system memory 102, and a system bus 104. The system bus 104 provides an interface for system components including, but not limited to, the system memory 102 and the central processing unit 100. The central processing unit 100 can be any commercially available or proprietary processor.

The system bus 104 may be any of several types of bus structures that may further interconnect to a memory bus (with or without a memory controller), a peripheral bus, and/or a local bus using any of a variety of commercially available bus architectures. The system memory 102 may include non-volatile memory 106 (e.g., ROM, EPROM, EEPROM, etc.) and/or volatile memory 108 (e.g., RAM). A BIOS 110 may be stored in the non-volatile memory 106, and can include the basic routines that help to transfer information between elements within the ACCD 30. The volatile memory 108 may also include a high-speed RAM, such as static RAM for caching data.

The ACCD 30 may further include or be coupled to the storage 40, which may comprise, for example, an internal or external HDD (e.g., EIDE or SATA), HDD (e.g., EIDE or SATA) for storage, flash memory, or the like. The computer-readable storage 40 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory, solid-state memory, cartridges, and the like, may also be used, and further, that any such media may contain computer-executable instructions for performing novel methods of the disclosed embodiments.

A number of modules can be stored in the computer-readable storage 40 and in the volatile memory 108, including an operating system 114 and one or more program modules 116, which may implement the functionality described herein in whole or in part, including, for example functionality associated with the video processor module 64, UI control module 66, and WebRTC module 38 and agent processing module 37.

All or a portion of the embodiments may be implemented as a computer program product stored on a transitory or non-transitory computer-usable or computer-readable storage medium, such as the computer-readable storage 40, which includes complex programming instructions, such as complex computer-readable program code, configured to cause the central processing unit 100 to carry out the steps described herein. Thus, the computer-readable program code can comprise software instructions for implementing the functionality of the embodiments described herein when executed on the central processing unit 100. The central processing unit 100, in conjunction with the program modules 116 in the volatile memory 108, may serve as a controller for the ACCD 30 that is configured to, or adapted to, implement the functionality described herein. The ACCD 30 also includes the communication interface 36 for communicating with the user device 12 via the network 20.

Those skilled in the art will recognize improvements and modifications to the preferred embodiments of the disclosure. All such improvements and modifications are considered within the scope of the concepts disclosed herein and the claims that follow.

Those skilled in the art will recognize improvements and modifications to the preferred embodiments of the disclosure. All such improvements and modifications are considered within the scope of the concepts disclosed herein and the claims that follow.

What is claimed is:

1. A method, comprising:
    establishing, by an automated contact center device (ACCD) associated with an automated contact center, a Web Real-Time Communications (WebRTC) interactive flow with a user device, the WebRTC interactive flow comprising a video channel and a text channel;
    determining, by the ACCD after establishing the WebRTC interactive flow with the user device, that no agent is available;
    providing, by the ACCD to the user device during an agent wait period, a text stream over the text channel of the WebRTC interactive flow, wherein the text stream is generated by processing external content to remove all image components, the text stream comprising a plurality of text components and no image components for presentation on the user device, the plurality of text components comprising at least an indication of a plurality of content categories and wherein at least one of the content categories comprises content from a source external to the automated contact center;
    receiving, by the ACCD from the user device via the video channel of the WebRTC interactive flow, a video stream depicting at least an eye of a user associated with the user device;
    determining, by the ACCD and based on an analysis of the video stream, that the user has issued a control command of a plurality of control commands that requests a change in a characteristic of the presentation, the plurality of control commands comprising at least a display text categories control command to request the indication of the plurality of content categories and a select current text category control command to select one of the indicated plurality of content categories; and
    in response to the control command, providing, by the ACCD to the user device, subsequent text components via the text channel of the WebRTC interactive flow in a manner that implements the change in the characteristic of the presentation in accordance with the control command.

2. The method of claim 1, further comprising:
    providing, by the ACCD to the user device via the text channel, a plurality of text stream categories;
    determining, by the ACCD based on the analysis of the video stream, a text stream category identifier that identifies a selected text stream category of the plurality of text stream categories;
    accessing, by the ACCD, a text source that comprises content in the selected text stream category; and
    providing, by the ACCD to the user device via the text channel, the text stream for presentation on the user device from the text source.

3. The method of claim 2, wherein accessing the text source further comprises:
    accessing, by the ACCD, a web site containing a plurality of web pages that comprises the content in the selected text stream category; and
    processing, by the ACCD, at least one web page of the plurality of web pages to generate the text stream.

4. The method of claim 2, further comprising:
    determining, by the ACCD based on the analysis of the video stream, that the user has issued a display text categories control command; and
    providing, by the ACCD to the user device via the text channel, the plurality of text stream categories to the user device in lieu of the text stream.

5. The method of claim 2, wherein providing the text stream for presentation on the user device further comprises:
    providing, by the ACCD to the user device via the text channel, the text stream for presentation on the user device at a first pace;
    determining, by the ACCD based on the analysis of the video stream, that the user has issued a pace control command; and
    in response to receiving the pace control command, providing, by the ACCD to the user device via the text channel, the text stream for presentation on the user device at a second pace.

6. An automated contact center device (ACCD) associated with an automated contact center, the ACCD comprising:
    a processor; and
    a memory coupled with and readable by the processor and storing therein a set of instructions which, when executed by the processor, causes the processor to handle a communication interaction with the contact center by:
    establishing, by the ACCD, a Web Real-Time Communications (WebRTC) interactive flow with a user device, the WebRTC interactive flow comprising a video channel and a text channel;
    determining, by the ACCD after establishing the WebRTC interactive flow with the user device, that no agent is available;
    providing, by the ACCD to the user device during an agent wait period, a text stream over the text channel of the WebRTC interactive flow, wherein the text stream is generated by processing external content to remove all image components, the text stream comprising a plurality of text components and no image components for presentation on the user device, the plurality of text components comprising at least an indication of a plurality of content categories and wherein at least one of the content categories comprises content from a source external to the automated contact center;
    receiving, by the ACCD from the user device via the video channel of the WebRTC interactive flow, a video stream depicting at least an eye of a user associated with the user device;
    determining, by the ACCD and based on an analysis of the video stream, that the user has issued a control command of a plurality of control commands that requests a change in a characteristic of the presentation, the plurality of control commands comprising at least a display text categories control command to request the indication of the plurality of content categories and a select current text category control command to select one of the indicated plurality of content categories; and
    in response to the control command, providing, by the ACCD to the user device, subsequent text components via the text channel of the WebRTC interactive flow in a manner that implements the change in the characteristic of the presentation in accordance with the control command.

7. The system of claim 6, further comprising:
provproviding, by the ACCD to the user device via the text channel, a plurality of text stream categories;
determining, by the ACCD based on the analysis of the video stream, a text stream category identifier that identifies a selected text stream category of the plurality of text stream categories;
accessing, by the ACCD, a text source that comprises content in the selected text stream category; and
providing, by the ACCD to the user device via the text channel, the text stream for presentation on the user device from the text source.

8. The system of claim 7, wherein accessing the text source further comprises:
accessing, by the ACCD, a web site containing a plurality of web pages that comprises the content in the selected text stream category; and
processing, by the ACCD, at least one web page of the plurality of web pages to generate the text stream.

9. The system of claim 7, further comprising:
determining, by the ACCD based on the analysis of the video stream, that the user has issued display text categories control command; and
providing, by the ACCD to the user device via the text channel, the plurality of text stream categories to the user device in lieu of the text stream.

10. The system of claim 7, wherein providing the text stream for presentation on the user device further comprises:
providing, by the ACCD to the user device via the text channel, the text stream for presentation on the user device at a first pace;
determining, by the ACCD based on the analysis of the video stream, that the user has issued a pace control command; and
in response to receiving the pace control command, providing, by the ACCD to the user device via the text channel, the text stream for presentation on the user device at a second pace.

11. A non-transitory computer-readable medium comprising a set of instructions stored therein which, when executed by a processor, causes the processor to handle, by an automated contact center device (ACCD) associated with an automated contact center, a communication interaction with the contact center by:
establishing, by the ACCD, a Web Real-Time Communications (WebRTC) interactive flow with a user device, the WebRTC interactive flow comprising a video channel and a text channel;
determining, by the ACCD after establishing the WebRTC interactive flow with the user device, that no agent is available;
providing, by the ACCD to the user device during an agent wait period, a text stream over the text channel of the WebRTC interactive flow, wherein the text stream is generated by processing external content to remove all image components, the text stream comprising a plurality of text components and no image components for presentation on the user device, the plurality of text components comprising at least an indication of a plurality of content categories and wherein at least one of the content categories comprises content from a source external to the automated contact center;
receiving, by the ACCD from the user device via the video channel of the WebRTC interactive flow, a video stream depicting at least an eye of a user associated with the user device;
determining, by the ACCD and based on an analysis of the video stream, that the user has issued a control command of a plurality of control commands that requests a change in a characteristic of the presentation, the plurality of control commands comprising at least a display text categories control command to request the indication of the plurality of content categories and a select current text category control command to select one of the indicated plurality of content categories; and
in response to the control command, providing, by the ACCD to the user device, subsequent text components via the text channel of the WebRTC interactive flow in a manner that implements the change in the characteristic of the presentation in accordance with the control command.

12. The non-transitory computer-readable medium of claim 11, further comprising:
providing, by the ACCD to the user device via the text channel, a plurality of text stream categories;
determining, by the ACCD based on the analysis of the video stream, a text stream category identifier that identifies a selected text stream category of the plurality of text stream categories;
accessing, by the ACCD, a text source that comprises content in the selected text stream category; and
providing, by the ACCD to the user device via the text channel, the text stream for presentation on the user device from the text source.

13. The non-transitory computer-readable medium of claim 12, wherein accessing the text source further comprises:
accessing, by the ACCD, a web site containing a plurality of web pages that comprises the content in the selected text stream category; and
processing, by the ACCD, at least one web page of the plurality of web pages to generate the text stream.

14. The non-transitory computer-readable medium of claim 12, further comprising:
determining, by the ACCD based on the analysis of the video stream, that the user has issued display text categories control command; and
providing, by the ACCD to the user device via the text channel, the plurality of text stream categories to the user device in lieu of the text stream.

15. The non-transitory computer-readable medium of claim 12, wherein providing the text stream for presentation on the user device further comprises:
providing, by the ACCD to the user device via the text channel, the text stream for presentation on the user device at a first pace;
determining, by the ACCD based on the analysis of the video stream, that the user has issued a pace control command; and
in response to receiving the pace control command, providing, by the ACCD to the user device via the text channel, the text stream for presentation on the user device at a second pace.

* * * * *